United States Patent Office 2,799,711
Patented July 16, 1957

2,799,711

PROCESS FOR PRODUCING HIGHLY CONCENTRATED CUMENE HYDROPEROXIDE

Enrico Beati and Febo Severini, Milan, Italy, assignors to Montecatini, Società Generale per l'Industria Mineraria e Chimica, a corporation of Italy No Drawing. Application January 23, 1956, Serial No. 560,879

Claims priority, application Italy January 26, 1955

5 Claims. (Cl. 260—610)

This invention relates to a new process for producing highly concentrated cumene hydroperoxide.

The peroxidation of cumene resulting in the formation of cumene hydroperoxide has been carried out by Hock and Lang (Berichte, deutsch. chem. Ges., vol. 77, 1944, page 254) by reacting molecular oxygen with cumene in the presence of ultraviolet light at a temperature of 85° C.

Various other methods have been subsequently suggested in order to perform this reaction on a commercial scale. However, in the absence of ultraviolet light, the reaction is extremely slow if preformed hydroperoxides are not added and if the operation is not carried out at rather high temperatures (above 100° C.).

According to still other proposals, the reaction is carried out in the presence of small quantities of basic substances or in the presence of salts, or the oxidation is accomplished in the presence of benzoic acid as catalyst.

All these processes yield a hydroperoxide which, after separation of unreacted cumene, has a purity generally not exceeding 90–95%. This low purity is due primarily to secondary reaction products, formed simultaneously with, or subsequently to, the formation of the hydroperoxide. Moreover, this low purity is due in part also to the influence of the soluble catalysts used.

It is the object of the present invention to eliminate these shortcomings and to furnish a solution of cumene hydroperoxide which is practically free from impurities, from which, by means of a simple steam distillation, unreacted cumene may be removed and very highly concentrated cumene hydroperoxide be obtained.

The present invention is based on the discovery of the particular catalytic action displayed by an acid catalyst, namely terephthalic acid, which is insoluble in both cumene and in the reaction mixture comprising peroxidized cumene.

Due to the insolubility of terephthalic acid, which, however, does not interfere with the catalytic action thereof, it is easy to separate the catalyst from the solution of cumene hydroperoxide in cumene and, because of the absence of other contaminants, it is possible to obtain a cumene hydroperoxide of 99–99.5% purity.

The peroxidation reaction with molecular oxygen or with gases containing molecular oxygen (air or oxygen diluted with an inert gas until the oxygen content is less than 11%) in the presence of terephthalic acid is conducted at temperatures between 80 and 100° C., and at pressures varying from 8 to 15 atm. Within this temperature range the catalyst displays its selective action to a maximum extent, keeping the oxidation chain reaction going and avoiding the formation of secondary products which lower the concentration of the final product. Furthermore, terephthalic acid as catalyst increases the reaction rate substantially over the reaction rate if the peroxidation is conducted in absence of catalysts. Therefore, terephthalic acid adds to its activity as accelerator of the peroxidation reaction of cumene or isopropylbenzene the property of selectivity, which is of advantage for the process, since, because of this selectivity, it is possible to obtain cumene hydroperoxide of high purity.

The reaction may be carried out at various temperatures and for each temperature it is possible, within certain limits, to vary the reaction rate by varying the amount of terephthalic acid employed. Because of the almost complete insolubility of terephthalic acid, the solubility of which is of the order not higher than one hundredth of a gram per liter of cumene, this acid can be completely recovered and reused. In practice, we prefer to use terephthalic catalyst at the rate of 0.1 to 2.0% per 100% of cumene.

The catalytic action of terephthalic acid on the rate of the oxidation chain reaction converting cumene to cumene hydroperoxide was entirely unforeseeable, considering that terephthalic acid (the para-isomer of phthalic acid) is almost completely insoluble in the reaction mixture and in view of the additional fact that orthophthalic acid and the anhydride thereof do not show any similar catalytic action. Without committing ourselves to any specific theory, we are inclined to believe that the favorable action of terephthalic acid is in part due to the fact that it forms an adsorption film on the walls of the reaction vessel, which acts as a negative catalyst against undesirable side reactions, occurring simultaneously with or subsequently to, the main reaction, such as, for example, reactions breaking the oxidation reaction chain, that seem to be promoted by the walls of the reaction vessel.

The catalyst is added at the beginning or during the reaction in form of a powder which, while remaining in suspension in the cumene, exerts its inhibiting action on secondary reactions and its accelerating action on the primary reaction. At the end of the reaction, the cumene hydroperoxide solution obtained is filtered from the terephthalic acid which can be recovered and reused.

The process according to the present invention, aside from allowing to recover the catalyst, furnishes a very highly concentrated hydroperoxide which, in further industrial processes, is far superior to the prior, similar products of lower concentration and inferior purity.

Another advantage is that, contrary to prior processes, the peroxidation reaction can be carried out by using commercial cumene not especially pre-treated and without the addition of preformed hydroperoxides. The reaction is conducted in a stainless steel autoclave having an unpolished interior surface.

The following examples are presented to illustrate a preferred manner of practicing the present invention. It will be obvious that various changes may be made without exceeding the scope of the invention as set forth in the appended claims.

*Example 1*

(a) 259 g. of cumene and 0.46 g. of terephthalic acid are introduced into a stainless steel shaking autoclave of 2180 cc. capacity. The terephthalic acid employed in this and the following examples is a highly purified product, such as, for example, Eastman Kodak terephthalic acid "For chemical purposes, not for drug use." The mixture is heated to 90° C. and air is introduced into the autoclave until an initial pressure of 11 atm. is attained. This operation is repeated until 9.8 atm. of oxygen at 90° C. corresponding to 13.9 normal liters (as measured at 0° C. and 760 mm. Hg pressure) have been absorbed.

The duration of the experiment is 20 hours. The average rate of the oxygen absorption is 0.49 atm./hour. The reaction liquid, consisting of a 33.8% cumene hydroperoxide solution, is first filtered in order to separate the catalyst, and is then steam distilled, under a pressure of 80 mm. Hg, in order to remove unreacted cumene.

94 g. of cumene hydroperoxide having a purity of 99.5% are obtained. The impurities consist of acetophenone.

(b) The experiment is conducted as described under (a) but in the presence of 3 g. of terephthalic acid catalyst. Operation is discontinued after absorption of 9.8 atm. of oxygen at 90° C. corresponding to 13.9 normal liters. The duration of the experiment is 18 hours; the average absorption rate is 0.54 atm./hour. The final product, consisting of 94 g. of cumene hydroperoxide, has a purity of 99.5%.

Example 2

(a) The experiment is conducted as described in Example 1 but at a temperature of 95° C., using 0.46 g. of terephthalic acid. Operation is interrupted after 9.5 atm. of oxygen at 95° C. corresponding to 13.25 normal liters have been absorbed. The duration of the experiment is 19 hours and the average absorption rate is 0.5 atm./hour. The reaction liquid consists of a 32.4% cumene hydroperoxide solution.

After separation of the catalyst and removal of the unreacted cumene by steam distillation at reduced pressure, 89.91 g. of cumene hydroperoxide having a purity of 99.3% are obtained.

(b) The operation is conducted as described under (a) but in the presence of 3 g. of terephthalic acid catalyst. An increase in the reaction rate is observed. The operation is discontinued after 9.15 atm. of oxygen at 95° C., corresponding to 12.7 normal liters, having been absorbed. The duration of the experiment is 14 hours and the average absorption rate is 0.65 atm./hour. The reaction liquid consists of a 31.2% cumene hydroperoxide solution. The final product, consisting of 86.17 g. of hydroperoxide, has a purity of 99.5%.

Example 3

(a) The experiment is conducted as described in Example 2, but at a temperature of 100° C., using 0.46 g. of terephthalic acid. The operation is discontinued after absorption of 9.35 atm. of oxygen at 100° C., corresponding to 12.9 normal liters. The duration of the experiment is 14 hours; the average absorption rate is equal to 0.668 atm./hour. The reaction liquid consists of a 31.6% cumene hydroperoxide solution. The final product, consisting of 87.5 g. of cumene hydroperoxide, has a purity of 99%.

(b) The operation is carried out as in (a) but 3 g. of catalyst are added. The operation is discontinued after absorption of 9.1 atm. of oxygen corresponding to 12.52 normal liters. The duration of the experiment is 9 hours and the absorption rate is equal to 1.01 atm. per hour. The reaction liquid consists of a 30.8% cumene hydroperoxide solution. The final product, consisting of 84.96 g. of hydroperoxide, has a purity of 99%.

Example 4

The operation is carried out as described in Example 3 but without addition of catalyst. The experiment is discontinued after absorption of 8.5 atm. of oxygen at a temperature of 100° C., corresponding to 11.6 normal liters. The duration of the experiment is 28 hours, the absorption rate is 0.3 atm. per hour. After removal of the unreacted cumene, 80 g. of product having a content in cumene hydroperoxide of 82% are obtained.

In the following table the reaction conditions taken from the above-described examples are summarized in order to unequivocally show the advantage of the herein claimed catalyst.

Examples

|  | 1a | 1b | 2a | 2b | 3a | 3b | 4 |
|---|---|---|---|---|---|---|---|
| g. cumene | 259 | 259 | 259 | 259 | 259 | 259 | 259 |
| g. terephthalic acid | 0.46 | 3 | 0.46 | 3 | 0.46 | 3 | 0 |
| percent by weight terephthalic acid; based on cumene | 0.18 | 1.16 | 0.18 | 1.16 | 0.18 | 1.16 | 0 |
| temperature, °C | 90 | 90 | 95 | 95 | 100 | 100 | 100 |
| duration; hours | 20 | 18 | 19 | 14 | 14 | 9 | 28 |
| percent by weight cumene hydroperoxide in solution | 33.8 | 33.8 | 32.4 | 31.2 | 31.6 | 30.8 | ------ |
| g. cumene hydroperoxide recovered | 9.0 | 94.0 | 89.91 | 86.17 | 87.17 | 84.96 | 80.0 |
| purity; Percent | 99.5 | 99.5 | 99.3 | 99.5 | 99.0 | 99.0 | 82.0 |
| hourly production of 100% pure cumene hydroperoxide per 100 g. of cumene | 1.80 | 2.01 | 1.81 | 2.30 | 2.32 | 3.61 | 0.90 |

As may be seen from the above-described examples, in comparison with the experiment without the catalyst, when using terephthalic acid the oxidation rate is from 2 to 4 times higher and the hydroperoxide obtained possesses a high degree of purity because the formation of secondary oxidation products is substantially reduced.

The foregoing results are obtained without the addition of catalysts other than terephthalic acid such as for example, preformed hydroperoxides which might be added in order to shorten the initial induction time.

It is to be pointed out that the terephthalic acid used must be free from detrimental impurities, for example nitroderivatives. Certain commerical terephthalic acids which are sufficiently pure to be used for the production of polyesters, are not sufficiently pure to be used as catalysts in this process. However, the catalyst may contain harmless impurities. For example, the terephthalic acid recovered by filtration of the peroxidation reaction mixture may be recycled although it is impure inasmuch as it is contaminated with cumene and cumene hydroperoxide.

We claim:

1. The process of preparing cumene hydroperoxide of high concentration and purity, which comprises subjecting cumene in the presence of terephthalic acid and at a temperature between 80 and 100° C. to the action of molecular oxygen diluted with at least one inert gas, and keeping the gaseous mixture at a pressure between 8 and 15 atmospheres.

2. The process of claim 1, comprising recovering terephthalic acid by separating the liquid phase.

3. The process of claim 1, comprising removing terephthalic acid and recovering substantially pure cumene hydroperoxide by steam-distilling at a pressure of about 80 mm. Hg.

4. The process of preparing cumene hydroperoxide of high concentration and purity, which comprises subjecting cumene in the presence of 0.1 to 2% of terephthalic acid and at a temperature between 80 and 100° C. to the action of air kept at a pressure between 8 and 15 atmospheres.

5. The process of preparing cumene hydroperoxide of high concentration and purity, which comprises subjecting cumene in the presence of 0.1 to 2% of terephthalic acid and at a temperature between 80 to 100° C. to the action of molecular oxygen diluted with at least one inert gas, and keeping the gaseous mixture at a pressure between 8 and 15 atmospheres.

References Cited in the file of this patent

UNITED STATES PATENTS 2,697,121    Monsnier et al. _____ Dec. 14, 1954